United States Patent [19]

Seiple et al.

[11] Patent Number: 6,032,108
[45] Date of Patent: Feb. 29, 2000

[54] SPORTS PERFORMANCE COMPUTER SYSTEM AND METHOD

[76] Inventors: Ronald Seiple, 1063 Koohoo Pl., Kailua, Hi. 96734; R. B. Seiple, 12319 Calle Albara, El Cajon, Calif. 92017

[21] Appl. No.: 09/111,844

[22] Filed: Jul. 8, 1998

[51] Int. Cl.[7] ........................................... G01S 5/02
[52] U.S. Cl. ................................ 702/97; 702/158
[58] Field of Search ....................... 701/119, 120, 701/121, 122, 216, 214, 213, 217; 702/142, 149, 150, 94, 95, 96, 97, 158

[56] References Cited

U.S. PATENT DOCUMENTS

| | | | |
|---|---|---|---|
| 5,119,101 | 6/1992 | Barnard | 342/357 |
| 5,191,792 | 3/1993 | Gloor | 73/178 R |
| 5,420,592 | 5/1995 | Johnson | 342/357 |
| 5,552,794 | 9/1996 | Colley et al. | 342/357 |
| 5,815,126 | 9/1998 | Fan et al. | 345/8 |
| 5,862,511 | 1/1999 | Croyle et al. | 701/213 |

OTHER PUBLICATIONS

Hoshen, Joseph, Jim Sennott and Max Winkler. "Keeping Tabs on Criminals," IEEE Spectrum, Feb., 1995.

*Primary Examiner*—Marc S. Hoff
*Assistant Examiner*—Craig Steven Miller
*Attorney, Agent, or Firm*—Leighton K. Chong

[57] ABSTRACT

A system, a signal bearing medium embodying a program of machine-readable instructions, and a method employing Global Positioning System (GPS) satellites to determine the current pace, the distance traveled and speed of a person, for example a runner, are disclosed. A GPS receiver for receiving signals from GPS satellites is attached to the person. A processor processes the signals received at a plurality of points from sub-sets of GPS satellites to determine the Earth Centered Earth Fixed (ECEF) fix in the x, y, and z planes relative to the center of the earth of each point. The processor detects when the signals are received from a different sub-set of satellites and corrects for the resulting fix error. The processor calculates the relative distance of the segment between the ECEF fixes of each pair of sequentially adjacent points, and adds together the distances of the segments to determine the distance of the path traveled by the person, which is defined by the points. Errors associated with determining position relative to navigational references such as latitude and longitude are not incurred because relative ECEF fixes are used to determine the distance rather than latitude and longitude fixes. Also, "Selective Availability" error, which is an error introduced into GPS signals by the U.S. military that limits the accuracy of GPS fixes relative to navigational references, does not degrade the accuracy of the distance calculations because the relative distance between the points is used to determine the distance traveled, rather than the distance of the points from navigational references. The processor calculates the elapsed time between selective points, and determines the average speed or pace of the person between selective points and current speed in minutes/mile. A storage device stores data structures representing the ECEF fixes of selective points, and data structures representing relative times that GPS signals are received at selective points. A signal-bearing medium tangibly embodying a program of for performing the above method that are executable by a digital processing device.

44 Claims, 10 Drawing Sheets

SPORTS PERFORMANCE COMPUTER SYSTEM AND METHOD

BACKGROUND OF THE INVENTION

1. Field of the Invention

The present invention relates to a system and method for determining the distance, speed and pace traveled by a person. More particularly, the invention concerns a system that is attached to the person, that processes and filters signals received from satellites to obtain kinematic measurements traveled by the person.

2. Description of the Related Art

For years runners have been attempting to precisely determine distance covered during their workout, their pace or current speed during their workouts. Although pedometers have been widely used for measuring distance, they have not proven to be sufficiently accurate. Also, pedometers are not able to directly indicate pace or speed. During races, rather than using pedometers, distance information is typically provided with distance markers placed along the course. While distance markers provide the runner with valuable distance information, they fail to directly indicate the runner's pace or speed. Average speed has typically been determined by measuring the elapsed time when the runner reaches a particular distance marker, and then manually dividing the distance by the elapsed time to calculate the average speed. Even the limited usefulness of distance markers is not available to runners on informal running courses, where distance markers are generally not available. Runners conducting interval work are forced to run on a measured track. When speed changes are required, current runners must calculate it mentally using time and distance.

In addition to runners, other athletes such as walkers, bicyclists, skiers, hikers, in-line skaters, swimmers, and triatheletes also frequently desire to determine the distance covered during their workouts, and their speed or variations of pace during their workouts. Additionally, distance and speed information is useful to health care professionals monitoring the exercise of their patients.

Navigation systems that calculate distance and speed information are widely known. For example, navigation systems that determine the latitude and longitude of ships and aircraft also commonly calculate the distance traveled and speed.

Global Positioning System (GPS) satellites have been widely used for navigational purposes to determine the latitude, longitude, and altitude of ships, aircraft and motor vehicles. Additionally, hand-held GPS receivers have been employed for mapping the latitude, longitude, and altitude of geographic locations on the earth.

GPS systems determine position by receiving signals from a sub-set of the 24 U.S. GPS satellites that are in operation. The signals transmitted by each satellite include a time code, which is synchronized with the time codes transmitted by the other satellites. The GPS system calculates an earth-centered-earth-fixed (ECEF) fix of a location where the signals are received, based on the time differences between the signals received from the satellites, and based upon the known locations of the satellites. ECEF is a 3-axis coordinate system with the origin located at the center of the earth. The satellites are not in geosynchronous orbits. The locations of the satellites are known because, prior to use the GPS system receives almanac and ephemeris data from the satellites. Almanac data is good for several weeks and is updated weekly. Ephemeris data is good for about 4 hours and is updated hourly. Almanac data consists of general information regarding all satellites in the constellation and ionospheric data for the determination of RF propagation delays. Almanacs are approximate orbital data parameters for all satellites. The typical ten-parameter almanacs describe the satellite orbits over extended periods of time of up to several months and a set for all satellites is sent to each satellite over a period of 12.5 minutes minimally. Signal acquisition time on receiver start-up can be significantly aided by the availability of current almanacs. The approximate orbital data is used to preset the receiver with the approximate position and carrier Doppler frequency, (i.e. the frequency shift carried by the rate of change in range to a moving satellite), of each satellite in the constellation. Ephemeris data consists of detailed orbital information for the specific observed satellite. It can take up to 15 minutes to initialize a GPS system if the ephemeris data is down. The ephemeris data when down means that no ephemeris data is in system memory and/or the ephemeris data is obsolete.

With the exception of the P-coded GPS receivers used by the U.S. military, GPS receivers suffer from an error referred to as "Selective Availability." This error is purposefully introduced by the U.S. military into the signals transmitted by the GPS satellites, in order to prevent unfriendly forces form using the full potential of the system. The nature of the error is such that it will report a consistent deviation, typically about 100 meters, while the GPS receiver is processing signals from the same sub-set of satellites. For example, the error will consistently be 100 meters south-southeast. This type of error is significantly detrimental to navigational systems that attempt to determine location with reference to a global mapping system, such as the latitude, longitude, and altitude global mapping system of World Geodetic Survey 1984 (WGS-84). Due to this error, non U.S. military GPS systems and commercial systems which do not augment the GPS with "Differential" processing have not proven useful for applications in which 100 meters is a significant error, such as when attempting to record a runner's position versus time.

As a result of selective availability error, a related error is introduced into GPS systems when there is a change in the sub-set of satellites used to obtain a fix. This can occur when one or more satellites become obscured by terrain, vegetation, buildings, the user's body, or if one or more satellites sets over the horizon. This additional error manifests itself as a jump in the indicated position of the receiver.

In addition to the errors in determining position discussed above, typical handheld GPS receivers also suffer from limited memory storage capacity. Hand-held GPS receivers typically allow for the storage of approximately 500 way points. This memory is quickly used up if the system stores each successive fix along an athlete's path of travel.

Known GPS systems also have the shortcoming of being too large and heavy to be unobtrusively attached to the wrist, waist, or other convenient area of an athlete's body during a workout. The size of these units is partially the result of the relatively large space required for batteries, which is necessitated by the amount of power consumption.

SUMMARY OF THE INVENTION

Broadly, the present invention concerns a system, a signal bearing medium embodying a program of machine-readable instructions, and a method, using Global Positioning System (GPS) satellites to determine kinematic measurements covered by a runner such as distance, speed or pace. Unlike GPS navigation systems that determine position relative to navigational references such as latitude and longitude, the present invention does not determine the position of the person relative to navigational references. Rather, the present invention measures the distance traveled by calculating the relative distance traveled by calculating the relative distance between each successive pair of ECEF fixes. The total distance traveled is the sum of the absolute values thereof. Also, the selective availability error in the signals received from the GPS satellites is effectively canceled out because the present invention determines the relative distance between the points, not the absolute distance of the ECEF points from navigational references. The present invention also determines when there has been a change in the sub-set of satellites used to obtain a fix, and corrects for the resulting error. By providing solutions to these problems, the invention affords its users with a number of distinct advantages.

The present invention can be used as a system that includes a GPS receiver configured to attach to a person's body for receiving signals from GPS satellites, wherein a processor is communicatively coupled to the GPS receiver. The processor processes the signals received at a plurality of points from sub-sets of GPS satellites to determine the ECEF fix in the x, y, and z planes relative to the center of the earth of each point where the GPS signals are received. The processor also detects when the signals received at a point are received from a different sub-set of satellites than the sub-set of satellites that the signals received at the preceding point were received from. The processor corrects for an error in the ECEF fix of each point at which the signals are first received from the different sub-set of satellites. Additionally, the processor calculates the relative distance of the segments between the ECEF fixes of each pair of sequentially adjacent points where the signals from the sub-sets of GPS satellites are received. The processor then adds together the distances of the segments to determine the distance of the path defined by the points. The processor also calculates the elapsed time between selective points at which GPS signals are received, and calculates the average speed of the person between selective points.

The system also includes a storage communicatively coupled to the processor for storing data structures representing the times that GPS signals are received at selective points relative to the times that GPS signals are received at other selective points. The storage also includes storage for data structures representing the ECEF fixes of selective points. Alternatively, the distance measurement can be determined using the carrier Doppler frequency from satellite signals to determine a Doppler velocity vector between selective points.

The present invention can also be made as an article of manufacture comprising a signal-bearing medium tangibly embodying a program of machine-readable instructions executable by a digital processing device for performing a method of determining kinematic measurements such as distance traveled, pace or speed of a person. The method includes processing data structures representing signals received at a plurality of points from sub-sets of GPS satellites to determine the ECEF fix of each point in the x, y, and z planes relative to the center of the earth. The method also includes determining when the data structures representing the signals received at a point are received from a different sub-set of satellites than the sub-set of satellites that the signals received at the preceding point were received from. The method corrects for an error in the ECEF fix of each point at which the signals are first received from the different sub-set of satellites. The method also includes calculating the relative distance of the segments between the ECEF fixes of each pair of sequentially adjacent points, and then adding together the distances of the segments to determine the distance of the path defined by the points.

The method also includes calculating the elapsed time between selective points at which GPS signals are received and calculating the average speed of the person between selective points at which GPS signals are received. The method also includes storing data structures representing the ECEF fixes of the points that are not intermediate points along a line, and storing data structures representing the relative times that the ECEF fixes of the points that are not intermediate points along a line are received.

The present invention is a method for determining the distance traveled by a person. This method is generally the same method as the method of the program embodied on the signal-bearing medium, but also includes the act of attaching a GPS receiver to a person for receiving signals from GPS satellites, and receiving with the GPS receiver at a plurality of points signals from sub-sets of GPS satellites.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION

The present invention concerns a system, a signal bearing medium embodying a program of machine-readable instructions, and a method, using Global Positioning System (GPS) satellites to determine the current speed of an athlete, distance traveled from the start and the actual pace in minutes per mile with accuracy to a tenth-of-a-mile. The system of the present invention is referred to as the Sports Performance Computer (SPC). The SPC produces a real time display of the user's actual performance. Unlike GPS navigation systems that determine position relative to navigational references such as latitude and longitude, the present invention does not determine the absolute position of the person relative to navigational references. Rather, the present invention determines in meters the Earth-Centered-Earth-Fixed (ECEF) fix of the location of the person at a plurality of points in the x, y, and z planes relative to the center of the earth, which has x, y, and z coordinates 0, 0, 0. The ECEF fix could equivalently be determined using polar coordinates. Using the ECEF fix eliminates errors associated with translating ECEF fixes into latitude and longitude positions, and errors related to determining the absolute position of the points relative to navigational references. The invention accurately determines distance speed and pace even if the position of the origin in the ECEF system is incorrect, as long as the error is consistent, because it is the relative distance between the points, rather than the absolute distance of the points to a reference, that is used to determine the distance, pace and speed.

Figure 1A:
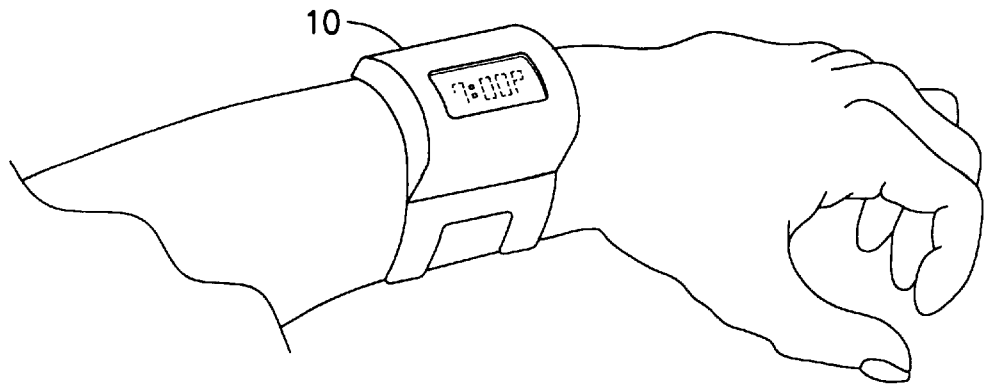
FIGS. 1a 1b & 1c are perspective views of an sports performance computer (SPC) in accordance with the invention.
Figure 1B:
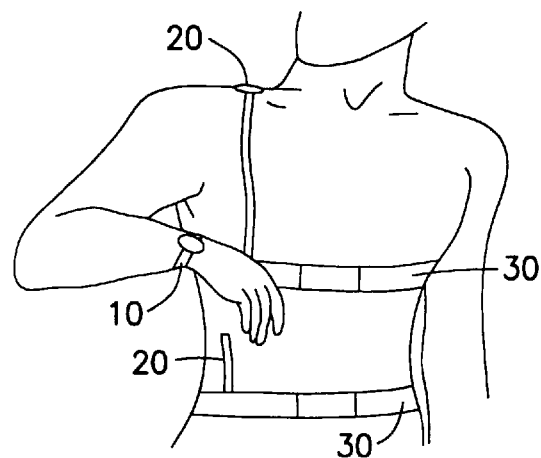
Figure 1C:
Figure 2:
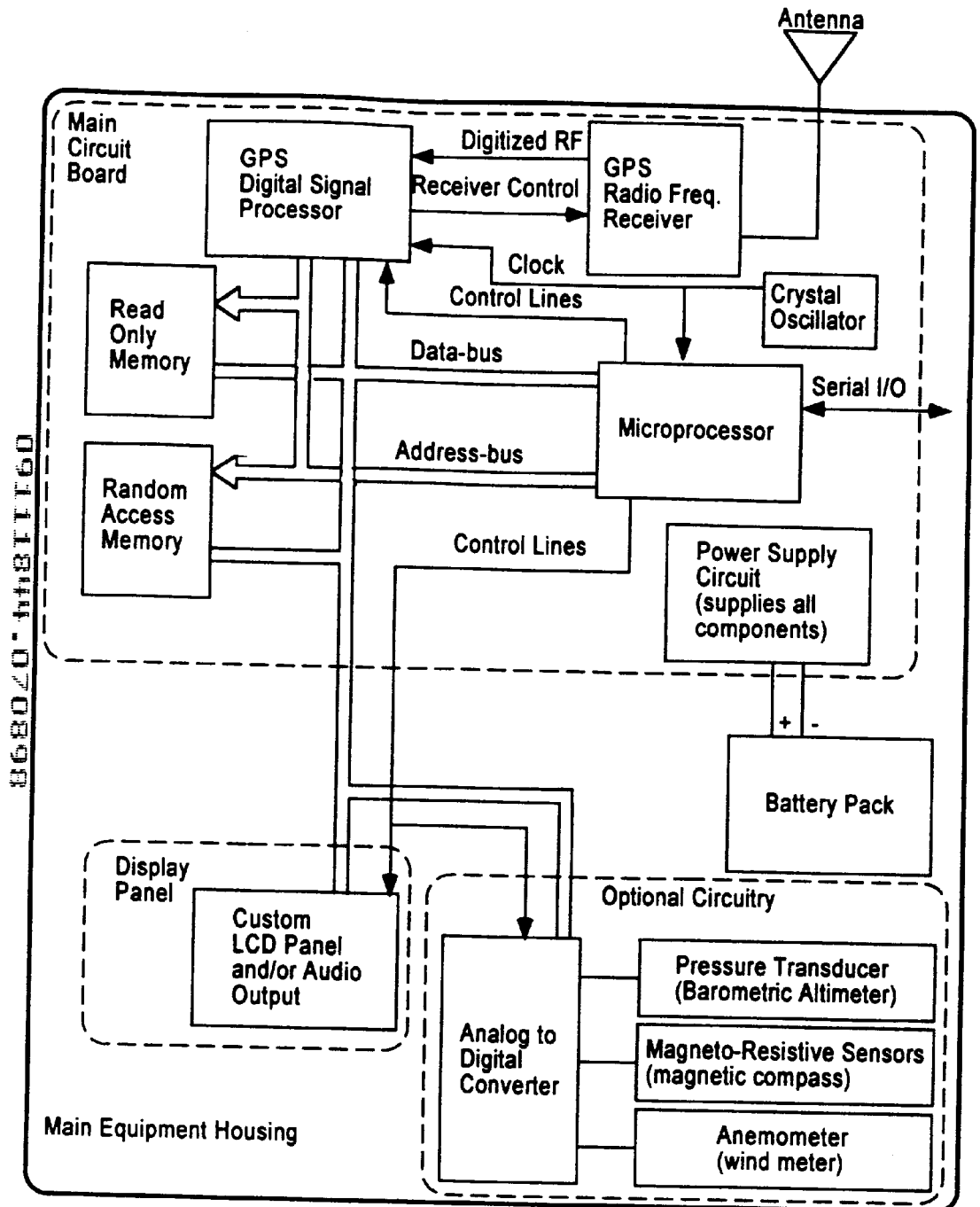
FIG. 2 is a block diagram of the hardware components and interconnections of a SPC in accordance with the invention.

Hardware Components & Interconnections:

The principal components of the SPC are a GPS receiver configured for attachment to the person for receiving signals from GPS satellites, a processor communicatively coupled to the GPS receiver, and a memory that is also referred to as storage. The hardware for the SPC is shown in FIG. 2 and includes an antenna which is external to the hardware housing shown in the solid outer line. The display panel can be either made as an integral SPC system as shown in FIG. 1a or be attached to other body parts such as a person's wrist as shown in FIG. 1b or hat visor as shown in FIG. 1c.

The processor will typically comprise two separate integrated circuits (IC's): a GPS digital-signal-processor (DSP) integrated circuit (IC) and a microprocessor IC. Alternatively, the processor could be a single IC. The GPS receiver is typically a specialized front end multi-channel radio frequency receiver IC.

Preferably the GPS receiver IC is paired with a companion specialized GPS DSP-IC. The GPS receiver IC outputs data used to determine ECEF fixes to the GPS-DSP. IC chip sets that include a GPS receiver IC and a companion GPS-DSP IC that are suitable for use in the SPC are available from a number of manufacturers, including: a "Sierra" chipset which is available from Trimble, Inc. at 645 N. Mary Ave., Sunnyvale, Calif.; a "SiRFstar™" chip set which is available from SiRF Technology, Inc., 107 San Zeno Way, Sunnyvale, Calif.,; or a similar chip set available from Garmin Inc. at 1200 E. 151 St., Olathe, Kans. Preferably, the Trimble "Sierra" chip set is used, with the GPS-DSP chip sets being customized to include firmware implementing the method of the present invention and use custom Large-Scale-Integration (LSI) for a compact design. Preferably, a Trimble Original Equipment Manufacturer (OEM) circuit motherboard is used with the Trimble Sierra chip set, although alternatively a custom circuit board can be used.

The microprocessor performs the final GPS fix calculations, and also handles the SPC control functions. The microprocessor can be a Motorola 68000 series microprocessor, e.g. a Motorola 68331 microprocessor. Typically, the microprocessor will be attached to a GPS manufactured motherboard, although a custom designed circuit motherboard can alternatively be used. Additionally, other microprocessors or microcontrollers that satisfy SPC processor specifications, could be used.

Alternatively, any of the IC's could be replaced with custom LSI-IC's, or with discrete components. As another alternative, it may be possible to implement the functions performed by the digital circuitry with discrete and/or integrated analog circuitry. As another alternative, the GPS-DSP and/or the microprocessor could be replaced with a complete computer, if the computer could be made small and light enough for the uses of the present invention. To conserve power, it is desirable to use IC's with the lowest possible operating voltages.

The SPC also includes a crystal oscillator circuit that provides clock signals to the GPS-DSP and to the microprocessor. Standard computer read-only-memory ROM is used to permanently store the SPC's software. Standard random access memory RAM is used to temporarily store ephemeris data, fix, time, distance, pace and speed data, and other operands.

As can be seen in FIG. 2, a number of data busses interconnect the components of the SPC. The ROM is in data communication with the GPS-DSP and the microprocessor. The RAM is in data communication with the GPS-DSP and the microprocessor. The GPS-DSP is in data communication with the GPS receiver IC, the microprocessor, the ROM and the RAM. The microprocessor is in data communication with the GPS-DSP, the RAM, the ROM, and the LCD panel. Address busses also connect the microprocessor and the GPS-DSP to the ROM and the RAM. The microprocessor also controls the GPS-DSP and the LCD panel through control lines. The GPS-DSP controls the GPS receiver through receiver control lines.

The SPC also includes an antenna, which receives the radio frequency (RF) signals from the satellites, and inputs those signals to the GPS receiver IC. Antenna design and placement is important for adequate reception. A dipole antenna is preferred. Alternatively, standard patch and helical antennas have been found to operate effectively, although they may experience signal blockage if not worn high on the person's body. As another alternative, contra-wound torodial helical antennas have the potential to provide effective coverage without incurring specific polarization or placement requirements. A conical antenna is another possible alternative.

The SPC includes a Liquid Crystal Display (LCD) panel that displays to the user the information produced by the SPC. This information can be displayed continuously, or on demand when the user presses a button. Instead of or in addition to the LCD, optionally, the visual output from the SPC could be displayed in a heads-up display attached to eyeglasses or a head-piece visor as shown in FIG. 1c. Also, the LCD may be physically separated from the other components and use a radio-link interface; in this way the LCD could be worn as a "watch-like" device while the GPS receiver antenna and microprocessor functions are worn elsewhere on the body as shown in FIG. 1b which shows the a portion of the SPC being worn as a shoulder harness for the receiver to have uninterrupted reception from the GPS satellites. The SPC must be attached to the user. For example, the SPC can be configured to be wrist mounted as shown in FIG. 1a; belt clip mounted; shoulder/armband mounted; as a belly PAC device with a simple display readout. The SPC can also be in a head mounted system integral to a visor or hat with a heads up display on flip down glasses; and/or as discussed below, as an audible system using a earphone headset.

The antenna unit 20 and GPS hardware 30 shown in FIG. 1b includes a radio frequency link which transmits information to a watch display panel 10. Alternatively, the SPC hardware could be attached to a belt and the RF link transmits display information to either a wrist worn display 10 unit or a visor mounted display 40 unit. FIG. 1c shows a head unit which has an LCD display panel 40 attached.

This display information includes: the total distance that the user has covered since a starting point in tenths of miles or tenths of kilometers, the total time elapsed since a starting time, the average speed since the starting time, and the current speed. Preferably, the current speed is determined by dividing the distance traveled between a specified number of the most recent points where the GPS signals are received, by the elapsed time between those points. Preferably, about 5 points are used to determine the current speed. The reciprocal of the speed can be calculated to indicate the pace in minutes per mile or minutes per kilometer. Alternatively, the current speed indicated can be the Doppler speed that can be calculated by the GPS-DSP based on the GPS signals received at the most recent point. To present the information in terms most familiar and useful to users of the SPC, preferably the speed information is indicated in terms of a pace, for example as a six minute mile, rather than as a rate of speed such as ten miles per hour.

Optionally, in addition to the LCD, the SPC could provide audio output of the information determined by the SPC. The audio information could comprise spoken works produced by the processor, that would be reproduced by a speaker, an earphone, or by headphones. For example, the audio output could tell the user his or her distance, elapsed time, average speed, and current speed.

Optionally, the SPC could include programmable alert functions used to visually or audibly cue the user, for example a runner, with information informing the user that he or she is ahead of, right on, or behind a target pace or other parameter previously entered into the SPC by the user. The SPC could also optionally provide for prompting the user for interval training. For example, the target speeds or distances for a given time interval, or the target pace for a given distance, could be programmed into the SPC. Then, during a workout the SPC would prompt the user by informing the user of the target speed, pace, or time for a new interval, and with information informing the user whether the user is ahead, right on, or behind the target speed or pace.

Optionally, the SPC could have a mono or stereo input to receive audio signals from a walkman type personal radio and/or music system. The SPC would mix the audio information received at the audio input with the audio information from the SPC, which would be outputted together into the speaker, earphone, or headphones.

One or more, and preferably four, buttons are electrically connected to the microprocessor to control the various functions of the SPC. The emphemeris and almanac downloading is an automated function that operates almost continuously by the SPC. The buttons can also allow the user to choose between various output formats for displaying information to the user, for example to choose between displaying speed information as a pace such as a six minute mile, or to display speed information as a rate of speed such as ten miles per hour, or to program the alert function, and/or perform the standard chronograph functions associated with a "stopwatch."

The SPC includes a battery pack and power supply circuitry for supplying power to the various components of the SPC. The battery pack and the power supply circuitry are designed to be as small as possible so that the SPC will be unobtrusive to the user. The power supply can be either a switching power supply, a linear power supply, or a combination of these power supplies. The power supply(s) regulate the main battery pack output voltage to provide all subsystems with their requisite power as shown in FIG. 2. Such power supplies are well known in the art.

The battery pack includes a main battery pack and a backup battery. The main battery pack supplies power to the power supply(s). The main battery pack preferably comprises rechargeable batteries such as "nickel metal hydride" or most preferably, "lithium ion" batteries. Alternatively, the main battery pack could comprise alkaline batteries, which are preferably AA or AAA size. The main battery pack preferably provides for a minimum of two hours of operation, and optimally would provide for four to five hours of operation. The backup battery provides backup power for the RAM, which maintains almanac and ephemeris data, and fix, time, distance, and speed data in the RAM. The backup battery is preferably a lithium-ion battery, although other types of batteries can be used.

The invention includes several important power conservation features. One such feature is that the GPS receiver IC and the GPS-DSP-IC are placed in the standby mode, also referred to as the sleep mode, between the times that signals are received from the GPS satellites to obtain a fix. Power is also conserved by reducing the clock rate of the microprocessor.

The microprocessor is operated at is full clock rate only while performing calculations related to obtaining a fix. The operating speed of the microprocessor is varied by varying the frequency of the programmable PLL that provides the clock input to the microprocessor.

This reduction in power consumption permits less battery volume, which results in a smaller overall size and weight of the SPC. The GPS receiver can determine which satellites are providing the clearest signals being received, and then process only the signals from those satellites to obtain fixes. Alternatively, by analyzing the ephemeris data, the SPC can determine which satellites are likely to have the greatest signal strength during the exercise period, and then processes data from only those satellites.

The preferred time interval for receiving signals from the satellites for updated fixes is every 1–3 seconds. However, due to the amount of power consumed when fixes are updated at this rate, fixes may be obtained every 5–15 seconds to extend battery life.

In an alternative embodiment, signals received from GPS satellites at a maximum number of points during a workout and thereby improve the system accuracy, the microprocessor determines the largest fix update rate that can be achieved for a given time period of operation and a given battery capacity. This may be equivalently described as determining the shortest possible equal time intervals between the times at which signals are received from the sub-sets of GPS satellites for a given running duration and a given amount of battery capacity.

As mentioned above, the motherboard of the OEM circuit board is used with the GPS receiver IC and the GPS-DSP-IC. This circuit board provides serial data output. In the SPC, the serial data output is converted to a parallel data output by inputting the serial data into a buffered four to eight (4–8) bit parallel data I/O port. A custom designed OEM motherboard can provide the parallel I/O port, as the current motherboard's microprocessor readily supports. Providing the parallel data output allows the SPC to interface with devices requiring parallel data, with fewer components which reduces the cost of the unit and saves power. The parallel data output can be used to provide data to whichever type of user interface is desired, for example, the local LCD display, an audio output, or a watch based display. Preferably the parallel output is connected to the LCD display. The serial interface is optimum for outputting data to an RF transmitter, which could be included in an alternative embodiment for use in a visual LCD display on the wrist or head-piece visor a shown in FIGS. 1b and 1c.

In an alternative embodiment, the SPC includes a magnetic field sensor, for example a simple magnetometer or flux gate compass. The magnetic field sensor is used to increase accuracy if blockage of signals from satellites is a problem. The output of the magnetic field sensor is inputted into the microprocessor. The processor process signals outputted from the magnetic field sensor to detect changes in the direction of travel of the user as shown in FIG. 2. In the embodiment of the SPC without the magnetic field sensor, if satellite blockage occurs during a time the user is conducting a turn the system will dead reckon the user's position based on the user's current direction and speed. In the embodiment with the magnetic field sensor, the SPC can determine the direction the runner is traveling during satellite blockage, and can compute the path of travel. For example, if the user gradually turns, an arc will be computed. The microprocessor will also be able to determine when the user makes a one hundred eighty degree turn, thereby avoiding significant speed and distance errors that could be introduced by dead reckoning.

In another alternative embodiment, the SPC includes an atmospheric pressure sensor, which may also be referred to as a barometer or altimeter. The altimeter is included to obtain more accurate determinations of the change in altitude of the user than can be achieved by processing GPS data alone in the SPC. Output signals from the atmospheric pressure sensor are inputted to the microprocessor. The microprocessor processes data from the atmospheric pressure sensor to calculate changes in the altitude of the user. To determine the actual altitude of the user, the atmospheric pressure sensor would have to be calibrated. However, there is no need to calibrate the atmospheric pressure sensor for use in the SPC because the microprocessor is able to determine the relative change in altitude of the user without determining the actual altitude of the user. The embodiment with the atmospheric pressure sensor would be especially useful for skiers, mountain bikers and cross country runners. This feature would allow the SPC to determine the slope of the athlete's track, allowing post event analysis of the user's hill performance. The display of this embodiment would show vertical speed and vertical pace information.

In another alternative embodiment, an anemometer could be built into the device or connected to the device to provide wind speed data. Such a sensory transducer would interface with these optional device's as shown in FIG. 2 as the Optional Circuitry. This information could be useful when determining the recommended club when golfing.

In another alternative embodiment, the SPC includes a transmitter. Preferably, the transmitter is an RF transmitter, although transmission of electromagnetic waves in other bandwidths could also be useful. In one embodiment, the RF transmitter could be a cellular telephone transmitter. The transmitter would enable transmission of information from the SPC to trainers, coaches and physical therapists in real time. The transmitter would also allow the user to transmit real time position information. This could be useful in emergency situations. For example, a person running, walking, hiking, or skiing in a nonpopulated area could press a button to cause the person's location to be automatically and immediately transmitted to police or a safety response team. Skier desire altimeter readings which can be an optional output signal to the LCD.

In another alternative embodiment, the SPC could be configured to input biomedical information, for example pulse rate, blood pressure, temperature, and/or other biomedical data from the user. This information would be sensed by appropriate sensors and inputted into the microprocessor. This information could then be correlated with the actual performance of the individual. This embodiment could be particularly useful for health care treatment and monitoring by physicians, physical therapists, and trainers.

In another alternative embodiment, the microprocessor is interfaceable with a host PC for downloading data via the serial I/O lines to a personal computer or other type of computer. The data would be downloaded through wires, or optionally, with an infra red transceiver. The SPC stores significant ECEF fixes as well as distance, time, current speed/pace and average speed/pace data in the RAM, which can be downloaded. This information is stored for post event downloading or to provide a stored running log for the athlete. After being downloaded to a computer, the post event data could be processed with post event software to display various histograms illustrating the athlete's performance under varying conditions, for example, as the athlete changes speeds or is climbing a hill. This post event analysis could be very useful to coaches, who would be able to conduct post review of an athlete's performance. Post event analysis software specific to particular sports could be provided for use with this embodiment.

For golf, the SPC can be used to compute the distance of a drive based on the tee position and the final lie of the ball. In an alternative embodiment, the SPC could provide for programming the distance to the green, and/or could include geographic maps of the course.

The SPC is preferably implemented as a single component as illustrated in FIG. 2 where the satellite antenna is worn outside the unit on a person head, hat visor or shoulder harness. Alternatively, the SPC could be implemented as two components. The two component implementation could include a main unit that could be located, for example, on the user's belt, and a second unit that could receive and display data that is received from the main unit via electromagnetic waves, for example RF signals. The processor, which comprises the GPS-DSP and the microprocessor, performs many important functions in the SPC. The GPS-DSP and the microprocessor processes the signals received from sub-sets of GPS satellites at points along the athlete's path to determine the ECEF fix in the x, y, and z planes relative to the center of the earth of each point where the GPS signals are received.

The GPS-DSP detects when the signals received at a point are received from a different sub-set of satellites than the sub-set of satellites that the signals received at the preceding point were received from. When the signals received are from a different sub-set of satellites, the position of the first fix with the new sub-set of satellites will include an offset error relative to the fixes of the points obtained from the previous sub-set of satellites. This offset is the result of the selective availability error that is introduced into the signals transmitted from the satellites by the U.S. military. The GPS-DSP communicates to the microprocessor that the signals have been received from a new sub-set of satellites. The microprocessor corrects for the error in the ECEF fix of each point at which the signals are first received from the different sub-set of satellites. Only the fix of the first point after the change in satellite sub-sets needs correction, because the relative distances between subsequent fixes will not be effected by the change in satellite sub-sets.

There are various methods that can be used to correct for the offset error. The preferred method is to dead-reckon the athlete's motion during the period of time the jump effects the relative position. The runner's most recent velocity vector data is used to estimate the athlete's position. This estimated position is used as the fix for the first point after the change in satellite sub-sets, the subsequent segment is measured between the first and second fixes received from the new satellite subset. Another method for correcting for the offset error is to maintain a lookup table of offset values for each possible combination of satellite subsets, and then subtract the offset from the fix data after a change occurs. The lookup table is maintained by, simultaneous with receiving the data from the satellites, calculating the error offset of all of the other possible sub-sets of satellites from the sub-set presently being used. This method is more accurate than dead reckoning, but is not preferred because of the substantial amount of computations and memory required, and the resulting drain on the batteries. Either method may be referred to as a software filter.

After correcting for the offset error due to changes in satellite sub-sets, if any, the microprocessor calculates the relative distance of the segments between the ECEF fixes of each pair of sequentially adjacent points where the signals from the sub-sets of GPS satellites are received. The distance of the segments between successive fixes is determined by using the Pythagorean theorem to calculate the hypotenuse between the points defined by the x, y, and z fix data. The distance between $fix_1$ and $fix_2 = \Delta Dist_{(fix1,\ fix2)} = \sqrt{((X_1-X_2)^2+(Y_1-Y_2)^2+(Z_1-Z_2)^2)}$. The distance between subsequent fixes is calculated in the same fashion.

The microprocessor adds together the distances of the segments to determine the overall distance of the path defined by the points where the GPS fixes were obtained. The total distance (for n fixes)=distance between $fix_1$ and $fix_2$+distance between $fix_2$ and $fix_3$+distance between $fix_3$ and $fix_4$+ . . . +distance between $fix_{n-1}$ and $fix_n$. This may be equivalently stated as:

$$\text{Total distance} = \Sigma_n = \Delta Dist_{(fix1,\ fix2)} + \Delta Dist_{(fix2,\ fix3)} + \Delta Dist_{(fix3,\ fix4)} + \ldots + \Delta Dist_{fix\ n-1,\ fix\ n}.$$

The microprocessor also calculates the elapsed time between selective points at which GPS signals are received, and calculates the average speed of the person between selective points. Preferably, the elapsed time and average speed/pace are calculated between the starting point and the most recent point, and the current speed is either calculated over the last 5 points, or by the GPS-DSP through Doppler processing of the satellite signals.

The system also includes a storage, which is preferably the RAM, which is communicatively coupled to the GPS-DSP and the microprocessor for storing data structures representing the times that GPS signals are received at selective points relative to the times that GPS signals are received at other selective points. The storage also includes storage for data structures representing the ECEF fixes of selective points.

Despite the specific foregoing description, ordinarily skilled artisans (having the benefit of this disclosure) will recognize that the system discussed above may be made differently, without departing from the scope of the invention. As a specific example, the memory storage may be incorporated in the processor.

Operation:

In addition to the various hardware embodiments described above, another aspect of the invention concerns a method for determining the distance, speed and pace traveled by a person.

FIGS. 3a–3g show the invention's methodology in flowchart form to operate the invention's SPC system. FIG. 4 is an alternative way to calculate the distance using the DSP-GPS's Doppler velocity measurements in place of the subroutine shown in FIG. 3b.

Figure 3A:
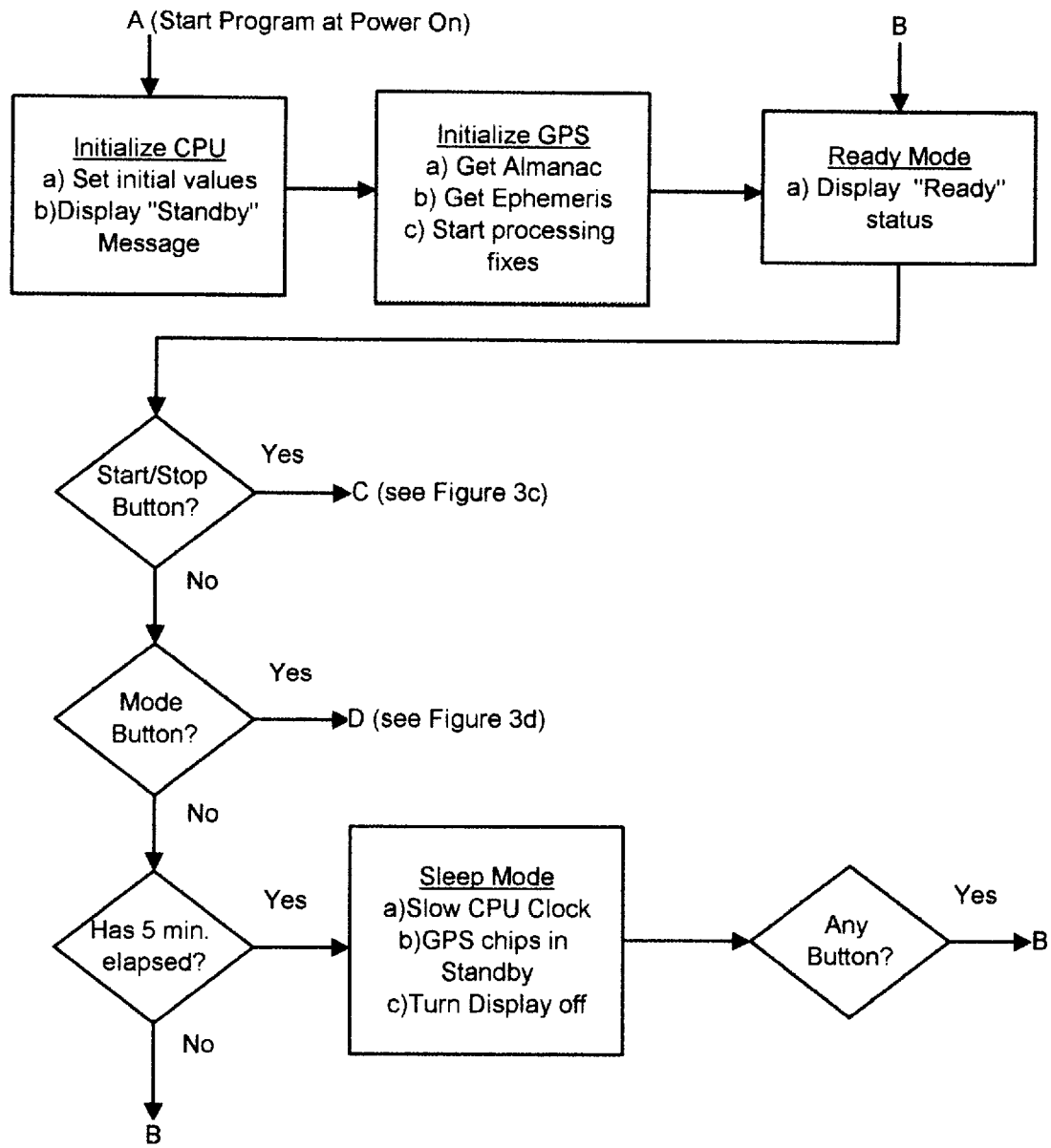
FIGS. 3a, 3b, 3c, 3d, 3e, 3f and 3g are flowcharts illustrating the steps performed by the main program and subroutines used to operate the SPC.
Figure 4:
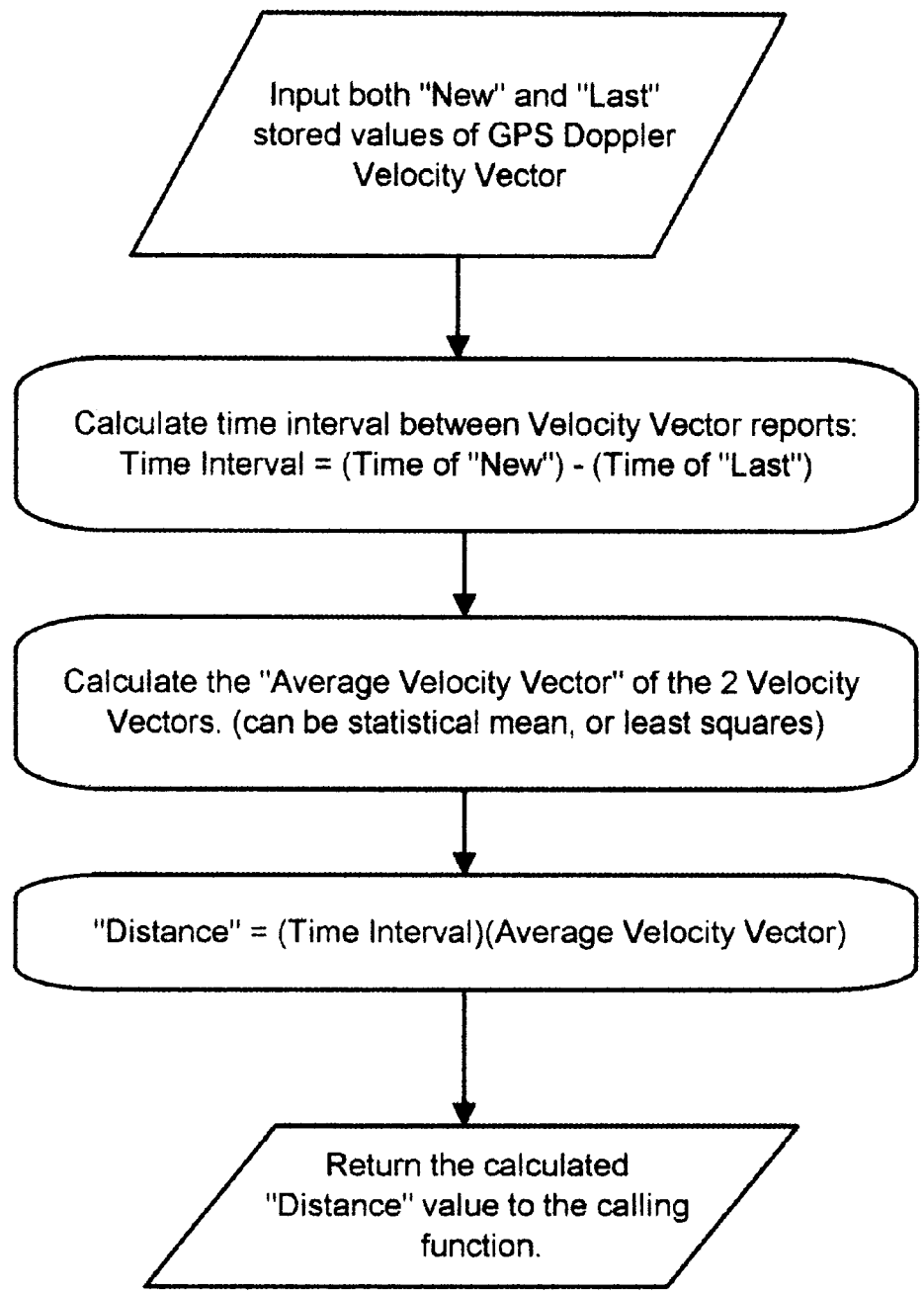
FIG. 4 is a flowchart illustrating an alternative subroutine for determining distance using satellite Doppler frequency signals to determine velocity vectors.

FIG. 3a is the SPC's main program which is the executive program for the SPC system which initializes the CPU processor device, initializes the GPS data readings, interfaces with the command buttons on the SPC's device's hardware and provides power conservation measures for the SPC.

Figure 3B:
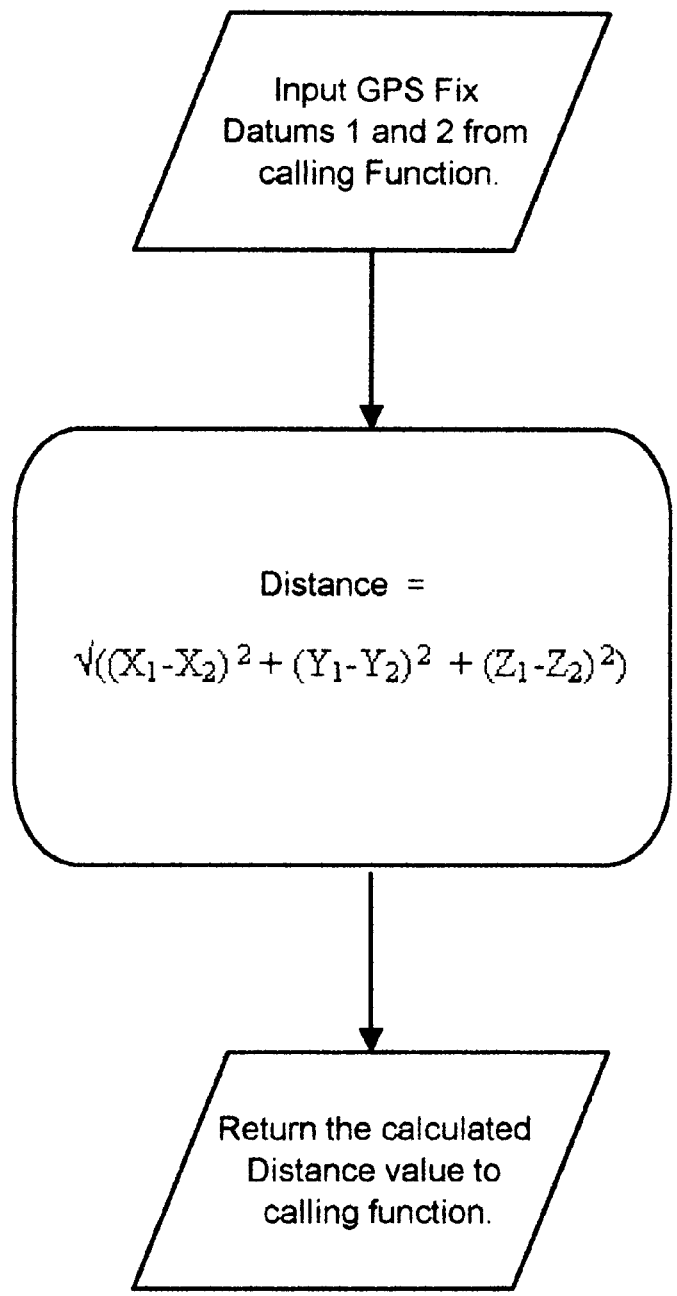

FIG. 3b is the "Distance" calculating function methodology which determines the distance between two ECEF fixes. It accepts data structures for each ECEF fix which provide the X,Y and Z axis information to determine distance by using the Pythagorean formula to calculate the distance between the two fixes.

Figure 3C:
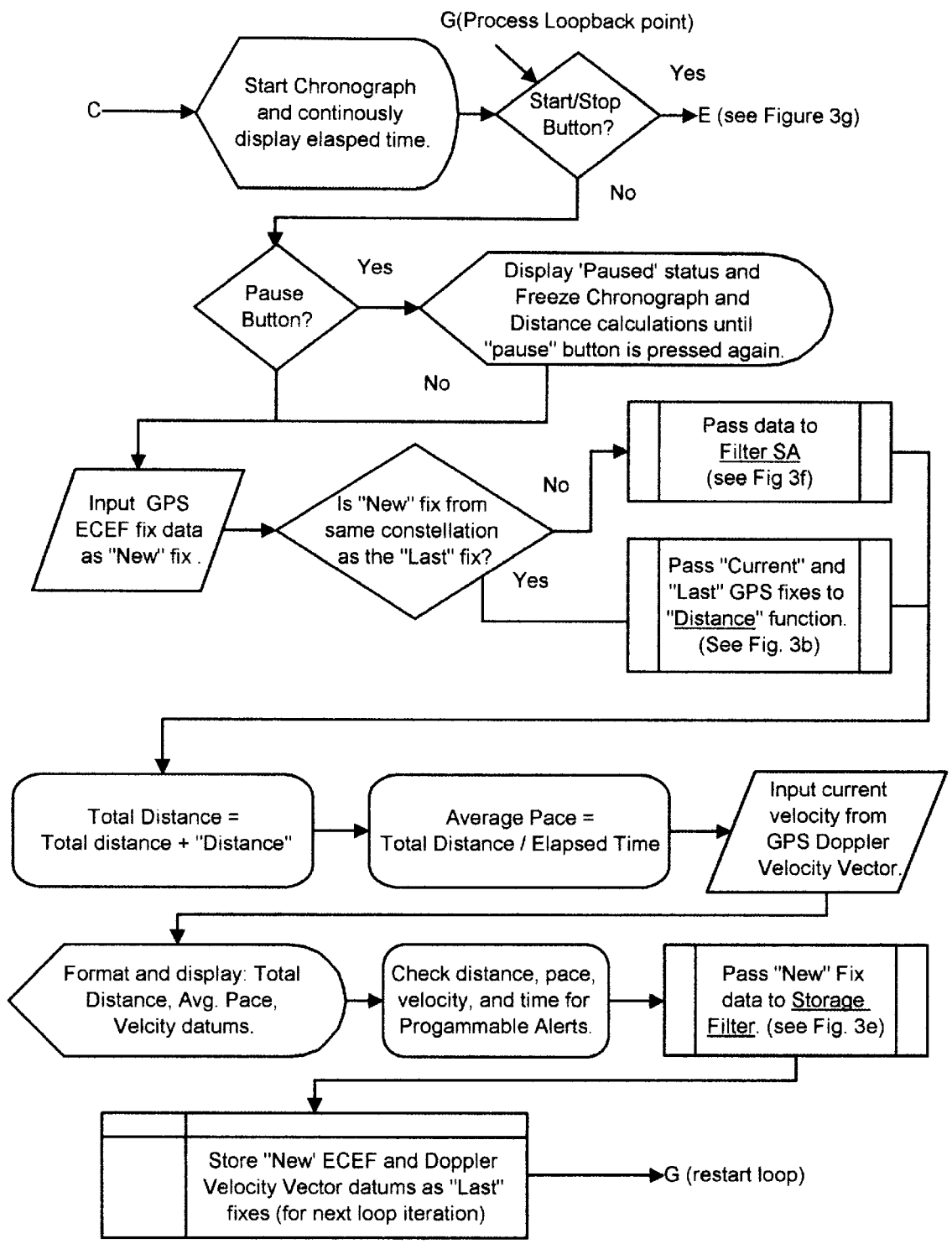

FIG. 3c is the "Run Mode" which is part of the main program operation which executes a series of time, distance and velocity measurements to according to the "GPS Fix Data" coming from the GPS receiver. The SPC's processor executes this "Run Mode" function which in turn provides ongoing performance of the SPC and also manages data required for performing the "Alert" and Event Storage" functions.

Figure 3D:
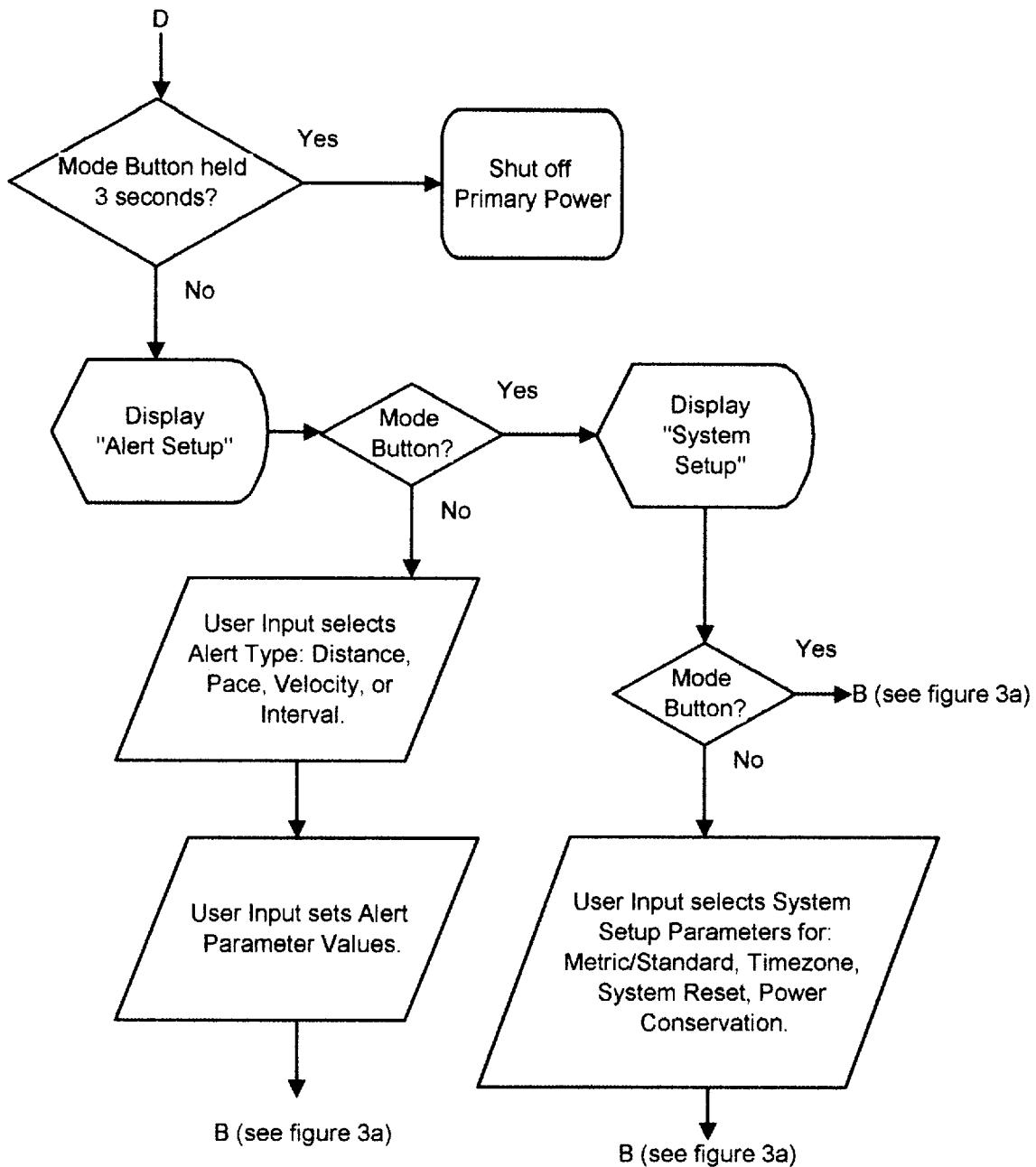

FIG. 3d is the set-up mode which functions to accept the user's input commands to initialize parameters using buttons on the SPC device.

Figure 3E:
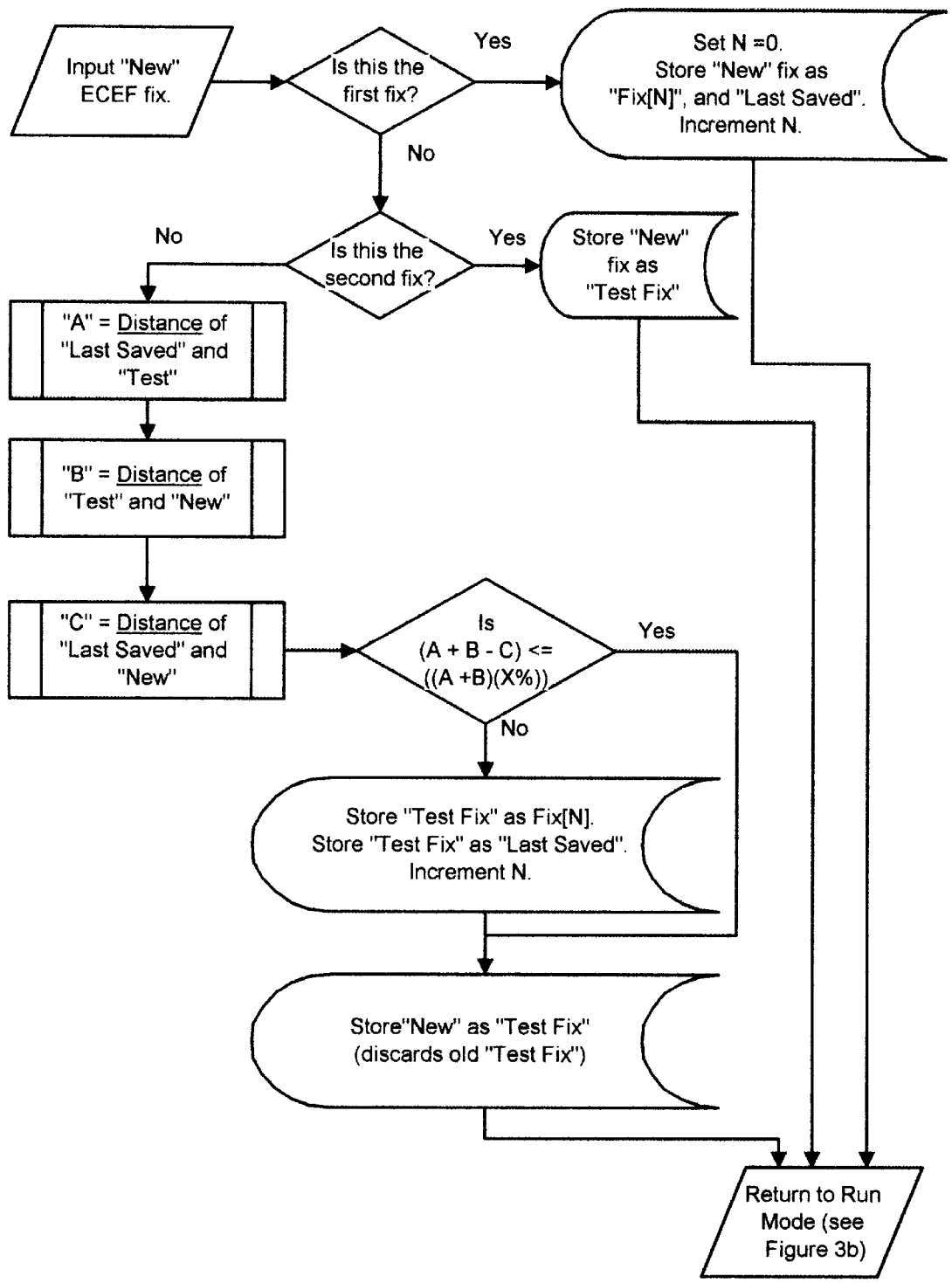

FIG. 3e is the "Storage Filter" mode that functions to eliminate the storage of redundant ECEF fixes. This "Filter" determines * if the point/fix "Test Fix" lies upon a line segment defined by points "Last Saved" and "New", within an acceptable error value of X%. Additionally, the "Filter" controls storage of significant fixes from these results. Storage of these significant fixes is in an array called "Fix[N]" where N is an integer value of one of the array elements.

Figure 3F:
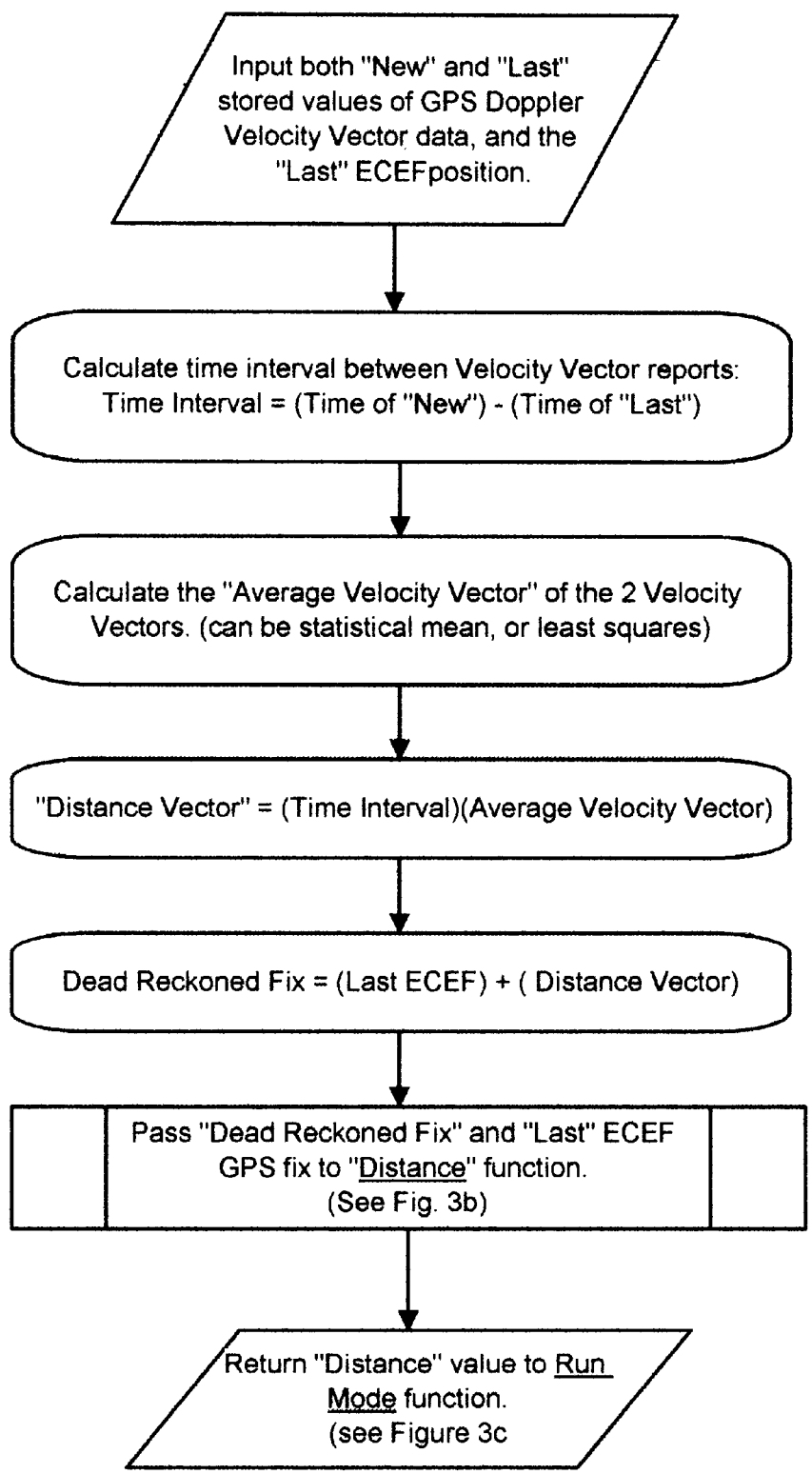

FIG. 3f is the "Filter SA" which functions to reduce the "Distance" measurement errors as determined in FIG. 3b due to measurement errors that can occur when there is a change in the subsets of GPS satellites used by the GPS receiver to determine the ECEF fix. The process compensates by dead reckoning the runner's position based upon vector determination which is the average of the previous two known velocity vectors.

Figure 3G:
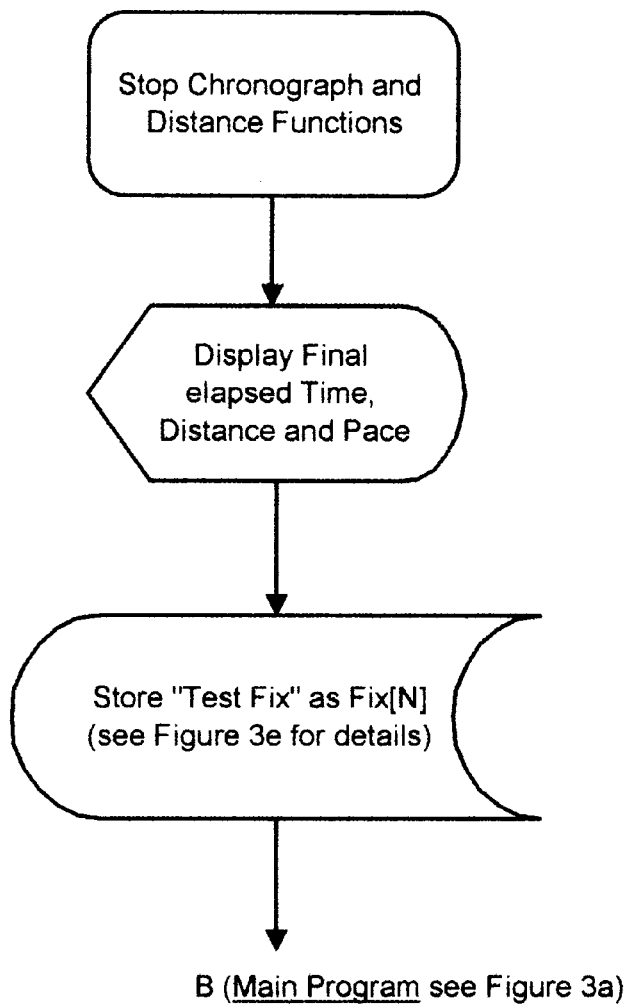

FIG. 3g is the "Stop Event" which closes the run mode loop and saves the last ECEF fix and stores this datum point in the next storage location and uses the stored data structure "Test Fix" is this datum point.

FIG. 4 is an alternate subroutine for the subroutine "Distance" as shown in FIG. 3b. This alternate subroutine is referred to as "Distance by Velocity Vector" which calculates the distance traveled based on the average of the last two known velocity vectors processed by the GPS's digital signal processor shown in FIG. 2 using shifts in synchronized satellite Doppler signal transmissions.

The GPS receiver is used to receive, at a plurality of points, signals from GPS satellites. The signals received at each point are processed to determine the ECEF fix of each point in the x, y, and z planes relative to the center of the earth. The method also includes detecting when the signals received at a point are received from a different sub-set of satellites than a sub-set of satellites that the signals received at the immediately preceding point were received from, and correcting for an error in the ECEF fix of each point at which the signals are first received from the different subset of satellites. The method additionally includes calculating the relative distance of the segments between the ECEF fixes of each pair of sequentially adjacent points, and adding together the distances of the segments to determine the distance of the path defined by the points.

The method further comprises calculating the elapsed time between selective points at which GPS signals are received, and calculating the average speed of the person between selective points at which GPS signals are received.

The method also includes storing data structures representing the times that GPS signals are received at selective points relative to the times that GPS signals are received at other selective points. The method also includes storing data structures representing the ECEF fixes of the points that are not intermediate points along a line. Additionally, for each abutting pair of segments, the method also includes calculating the sum of the distances of the abutting pair of segments, and calculating the relative distance between the two points at the opposite ends of the abutting pair of segments. The method also includes subtracting the sum of the distances of the abutting pair of segments from the relative distance between the two points at the opposite ends of the abutting pair of segments, and comparing the result of the subtraction to a predetermined error to determine whether the common point between the abutting pair of segments is an intermediate point on a line defined by the two points at the opposite ends of the abutting pair of segments.

In the method, calculating the relative distance of the segments between the ECEF fixes of each pair of sequentially adjacent points where the signals from the sub-sets of GPS satellites are received comprises calculating the square root of the sum of the squares of the distances in the x, y, and z planes between the ECEF fixes of each pair of sequentially adjacent points.

Signal Bearing Media:

The present invention can also be implemented as an article of manufacture comprising a signal-bearing medium tangibly embodying a program of machine-readable instructions executable by a digital processing device to perform a method for determining the distance, speed and pace traveled by a person. The method on the signal-bearing medium is the method described above, except for attaching a GPS receiver to the person and receiving the signals with the GPS receiver. This method on the signal-bearing medium may be implemented, for example, by operating the SPC to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to determine the distance, speed or pace traveled by a person.

This signal-bearing media may comprise, for example, a custom LSI chip directly or indirectly accessible by the processor. Alternatively, the instructions may be contained in another signal-bearing media, ROM or RAM directly or indirectly accessible by the processor. Whether ultimately contained in the custom LSI chip, ROM, RAM or elsewhere, the instructions may be stored on a variety of machine-readable data storage media, such as a conventional magnetic data storage diskette, a conventional "hard drive", magnetic tape, electronic read-only memory (e.g., ROM, CD-ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. The machine-readable instructions may comprise lines of compiled C, Pascal or C++ or other language code.

While there have been shown what are presently considered to be preferred embodiments of the invention, it will be apparent to those skilled in the art that various changes and modifications can be made herein without departing from the scope of the invention as defined by the appended claims.

What is claimed is:

1. A system for determining kinematic measurements along a course traveled by a person, comprising:

means for attaching the system to the person, said system having means for receiving signals from a set of global positioning satellites which are subject to selective availability errors purposefully introduced into the signals, said signal receiving means being capable of receiving signals at each point of a plurality of points along the course from a sub-set of said global positioning satellites;

means for processing the signals received at each point to determine an earth-centered-earth-fixed (ECEF) fix of each point in x, y, and z planes relative to the earth's center, wherein any selective availability errors in the ECEF fixes processed from signals received from the same sub-set of satellites at successive points along the course are effectively canceled out by calculation of relative kinematic measurements for the successive points;

means for determining when the signals received at a current one of the plurality of points is received from a different sub-set of satellites than the sub-set of satellites from which signals are received at an immediately preceding point, wherein a jump error may be introduced in the fix for the current point as compared to the fix for the preceding point when they are obtained from different sub-sets of satellites;

means for correcting the lump error in the ECEF fix at the current point at which the determining means determines that signals are first received from the different subset of satellites; and means for calculating relative kinematic measurements for segments between the ECEF fixes of each pair of sequentially adjacent points with any jump error between fixes being corrected by said jump error correcting means.

2. The system of claim 1 wherein the means for calculating distance includes means for adding together each of the distance of the segments between the ECEF fixes of each pair of sequentially adjacent points to determine the total distance.

3. The system of claim 1 wherein the means for calculating distance of segments includes means for processing a satellite's carrier Doppler frequency to determine changes in a Doppler velocity vector between the ECEF fix of each pair of sequentially adjacent points.

4. The system of claim 1 further comprising:

means for determining whether a common point between two successive segments of sequentially adjacent points lies within a given error on a line defined by the two points at opposite ends of the successive segments; and means for storing data structures representing the ECEF fixes of the points along the course, excluding common points that are lying on a line between opposite end points of successive segments.

5. The system recited in claim 1 further comprising means for calculating elapsed time of the person between selective points at which the signals are received, and pace and speed of the person between selective points at which the signals are received.

6. The system recited in claim 1 further comprising means for calculating the instantaneous speed and pace of the person at selective points at which the signals are received.

7. The system recited in claim 1 further comprising storage means communicatively coupled to the means for processing the signals received at each point, the storage means comprising storage for data structures representing times that the signals are received at selective points relative to times that the signals are received at other selective points, the storage means further including storage for data structures representing the ECEF fixes of points that are not intermediate points along a line of segments of ECEF fixes.

8. The system claimed in claim 1 further comprising:

first means for calculating a distance between ECEF fixes of points for each segment of a pair of successive segments, and a sum of the distances of the pair of successive segments;

second means for calculating a relative distance between the ECEF fixes of the two points at the opposite ends of the pair of successive segments;

third means for subtracting the sum of the distances of the pair of successive segments from the relative distance between the two points at the opposite ends of the pair of successive segments; and fourth means for comparing the subtraction results of said third means to a predetermined error to determine whether a common point between the pair of successive segments lies on a line defined by the two points at the opposite ends of the pair of successive segments, whereby the fix for said common point lying on the line between opposite end points of the successive segments may be excluded from data storage to save on data storage space.

9. The system recited in clam 1 further comprising means for detecting the person's directional changes of travel.

10. The system recited in claim 1 further comprising means for determining changes in altitude.

11. The system recited in claim 1 further comprising means for determining shortest possible equal time intervals between times at which signals are received from the sub-sets of satellites for a given time period and battery capacity, to receive signals from the sub-sets of satellites at a maximum number of points.

12. The system recited in claim 1 wherein the means for calculating the distance of the segments between the ECEF fixes of each pair of sequentially adjacent points where the signals from the sub-sets of satellites are received comprises means for calculating the square root of the sum of the squares of the distances in the x, y, and z planes between the ECEF fixes of each pair of sequentially adjacent points.

13. The system recited in claim 1 further comprising means for outputting kinematic measurements and carried on a wrist band.

14. The system recited in claim 1 further comprising means for outputting kinematic measurements and carried on a head-piece.

15. The system recited in claim 1 further comprising means for determining wind-speed measurements.

16. The system recited in claim 1 further comprising means for transmitting output data via a radio-frequency link.

17. A system according to claim 1, wherein said jump error correction means operates by calculating a most recent velocity vector for the person from a preceding segment, estimating a next fix based upon said most recent velocity vector from the preceding segment, using the estimated next fix for a first point after signals are received from a different sub-set of satellites, and determining a subsequent segment measured between first and second fixes received from the different sub-set of satellites.

18. A system according to claim 1, wherein said jump error correction means operates by maintaining a lookup table of offset values for each possible combination of satellite subsets, and subtracting a corresponding offset value from the fix for a first point after signals are received from a different sub-set of satellites.

19. An apparatus for determining temporal distance measurements along a course traveled by a person, comprising:

a receiver configured for attachment to the person for receiving signals from a set of global positioning satellites which are subject to selective availability errors purposefully introduced into the signals, said receiver being capable of receiving signals at each point of a plurality of points along the course from a sub-set of said global positioning satellites; and a processor communicatively coupled to the receiver, the processor being configured with means for:

processing the satellite signals received at a plurality of points from sub-sets of satellites to determine an earth-centered-earth-fixed (ECEF) fix in x, y, and z planes relative to earth's center of each point where signals are received;

determining when the signals received at a point are received from a different sub-set of satellites than the sub-set of satellites from which signals were received at the immediately preceding point;

correcting for a jump error that may be introduced in the ECEF fix of each point at which the signals are first received from the different sub-set of satellites;

calculating a distance of each segment between ECEF fixes of each pair of sequentially adjacent points where the signals from the sub-sets of satellites are received, whereby selective availability errors in the signals are cancelled out by calculating the relative distance between ECEF fixes of sequentially adjacent points; and adding together each of the distances of the segments to determine a total distance of a path defined by the points.

20. The apparatus recited in claim 19 wherein the processor is configured to calculate elapsed time between selective points at which signals are received, and the speed of the person between selective points at which satellite signals are received.

21. The apparatus recited in claim 19 wherein the processor is configured to calculate the instantaneous speed of the person at selective points at which signals are received.

22. The apparatus recited in claim 19 further comprising a storage communicatively coupled to the processor, the storage comprising storage for data structures representing the times that signals are received at selective points relative to the times that signals are received at other selective points, the storage further comprising storage for data structures representing the ECEF fixes of the points that are not intermediate points along a line.

23. The apparatus recited in claim 19 wherein the processor further comprises:

first means for calculating a sum of the distances of a pair of successive segments;

second means for calculating a relative distance between the ECEF fixes of the two points at the opposite ends of the pair of successive segments;

third means for subtracting the sum of the distances of the pair of successive segments from the relative distance between the two points at the opposite ends of the pair of successive segments; and fourth means for comparing the subtraction result of said third means to a predetermined error to determine whether a common point between the pair of successive segments lies on a line defined by the two points at the opposite ends of the pair of successive segments, whereby the fix for said common point lying on the line between opposite end points of the successive segments may be excluded from data storage to save on data storage space.

24. The apparatus recited in claim 19 further comprising a magnetic field sensor communicatively coupled to the processor, and wherein the processor is configured to process data from the magnetic field sensor to detect when the direction of travel of the person has changed.

25. The apparatus recited in claim 19 further comprising an atmospheric pressure sensor communicatively coupled to the processor, and wherein the processor is configured to process data from atmospheric pressure sensor to calculate the person's change in altitude.

26. The apparatus recited in claim 19 wherein the processor is configured to determine the shortest possible equal time intervals between the times at which signals are received from the sub-sets of satellites for a given running duration and a given amount of battery capacity, to receive signals from the sub-sets of satellites at a maximum number of points.

27. The apparatus recited in claim 19 wherein calculating the distance of the segments between the ECEF fixes of each pair of sequentially adjacent points where the signals from the sub-sets of satellites are received comprises calculating a square root of a sum of the squares of distances in x, y, and z planes between the ECEF fixes of each pair of sequentially adjacent points.

28. An apparatus according to claim 19, wherein said jump error correction means operates by calculating a most recent velocity vector for the person from a preceding segment, estimating a next fix based upon said most recent velocity vector from the preceding segment, using the estimated next fix for a first point after signals are received from a different sub-set of satellites, and determining a subsequent segment measured between first and second fixes received from the different sub-set of satellites.

29. An apparatus according to claim 19, wherein said jump error correction means operates by maintaining a lookup table of offset values for each possible combination of satellite sub-sets, and subtracting a corresponding offset value from the fix for a first point after signals are received from a different sub-set of satellites.

30. A signal bearing medium tangibly embodying a program of machine-readable instructions executable by a digital processing device to perform a method for determining kinematic measurements along a course traveled by a person, the method comprising:

processing satellite data signals received at a plurality of points from sub-sets of satellites to determine an earth-centered-earth-fixed (ECEF) fix in x, y, and z planes relative to earth's center of each point where signals are received, wherein the satellite data signals received are subject to selective availability errors purposefully introduced into the signals;

determining when the signals received at a point are received from a different sub-set of satellites than the sub-set of satellites from which signals were received at the immediately preceding point;

correcting for a jump error that may be introduced in the ECEF fix of each point at which the signals are first received from the different sub-set of satellites;

calculating a distance of each segment between ECEF fixes of each pair of sequentially adjacent points where the signals from the sub-sets of satellites are received, whereby any selective availability errors in the signals are cancelled out by calculating the relative distance between ECEF fixes of sequentially adjacent points; and adding together each of the distances of the segments to determine a total distance of a path defined by the points.

31. The method performed by the program embodied on the signal bearing medium of claim 30 further comprising storing data structures representing the ECEF fixes of the points that are not intermediate points along a line, and further comprising storing data structures representing times that the ECEF fixes of the points that are not intermediate points along a line are received.

32. The method performed by the program embodied on the signal bearing medium of claim 30 further comprising calculating an elapsed time between selective points at which the GPS signals are received and calculating a speed of the person between selective points at which the GPS signals are received.

33. The method recited in claim 30 further comprising:

calculating a distance between ECEF fixes of points for each segment of a pair of successive segments, and a sum of the distances of the pair of successive segments;

calculating a relative distance between the ECEF fixes of the two points at the opposite ends of the pair of successive segments;

subtracting the sum of the distances of the pair of successive segments from the relative distance between the two points at the opposite ends of the pair of successive segments; and comparing the subtraction results of said third means to a predetermined error to determine whether a common point between the pair of successive segments lies on a line defined by the two points at the opposite ends of the pair of successive segments, whereby the fix for said common point lying on the line between opposite end points of the successive segments may be excluded from data storage to save on data storage space.

34. The method performed by the program embodied on the signal bearing medium of claim 30 wherein calculating the distance of the segments between the ECEF fixes of each pair of sequentially adjacent points comprises calculating the square root of the sum of the squares of the distances in the x, y, and z planes between the ECEF fixes of each pair of sequentially adjacent points.

35. A method for a signal bearing medium according to claim 30, wherein said jump error correcting step is obtained by calculating a most recent velocity vector for the person from a preceding segment, estimating a next fix based upon said most recent velocity vector from the preceding segment, using the estimated next fix for a first point after signals are received from a different sub-set of satellites, and determining a subsequent segment measured between first and second fixes received from the different sub-set of satellites.

36. A method for a signal bearing medium according to claim 30, wherein said jump error correcting step is obtained by maintaining a lookup table of offset values for each possible combination of satellite sub-sets, and subtracting a corresponding offset value from the fix for a first point after signals are received from a different sub-set of satellites.

37. A method for determining kinematic measurements along a course traveled by a person, comprising:

attaching a global positioning system (GPS) receiver to the person for receiving signals from GPS satellites, wherein the satellite signals received are subject to selective availability errors purposefully introduced into the signals;

receiving at each of a plurality of points alone the course signals from a sub-set of GPS satellites at the GPS receiver;

processing the signals received at each point to determine an earth-centered-earth-fixed (ECEF) fix of each point in x, y, and z planes relative to earth's center;

determining when the signals received at a point are received from a different sub-set of satellites than a sub-set of satellites from which signals were received at the immediately preceding point;

correcting for a lump error that may be introduced in the ECEF fix of each point at which the signals are first received from the different sub-set of satellites;

calculating a distance of each segment between ECEF fixes of each pair of sequentially adjacent points, whereby any selective availability errors in the signals are cancelled out by calculating the relative distance between ECEF fixes of sequentially adjacent points; and adding together the distances of the segments to determine a total distance of a path defined by the points.

38. The method recited in claim 37 further comprising calculating elapsed time between selective points at which the GPS signals are received, and further comprising calculating the speed of the person between selective points at which the GPS signals are received.

39. The method recited in claim 37 further comprising storing data structures representing times that the GPS signals are received at selective points relative to times that the GPS signals are received at other selective points, and further comprising storing data structures representing ECEF fixes of points that are not intermediate points along a line.

40. The method recited in claim 37 further comprising:

calculating a distance between ECEF fixes of points for each segment of a pair of successive segments, and a sum of the distances of the pair of successive segments;

calculating a relative distance between the ECEF fixes of the two points at the opposite ends of the pair of successive segments;

subtracting the sum of the distances of the pair of successive segments from the relative distance between the two points at the opposite ends of the pair of successive segments; and comparing the subtraction result to a predetermined error to determine whether a common point between the pair of successive segments lies on a line defined by the two points at the opposite ends of the pair of successive segments, whereby the fix for said common point lying on the line between opposite end points of the successive segments may be excluded from data storage to save on data storage space.

41. The method recited in claim 37 wherein calculating the distance of the segments between the ECEF fixes of each pair of sequentially adjacent points where the signals from the sub-sets of GPS satellites are received comprises calculating a square root of the sum of the squares of the distances in the x, y, and z planes between the ECEF fixes of each pair of sequentially adjacent points.

42. The method recited in claim 37 wherein calculating the distance of the segments between the ECEF fixes of each pair of sequentially adjacent points wherein signals from a satellite's carrier Doppler frequency are processed to determine changes in a Doppler velocity vector between the ECEF fix of each pair of sequentially adjacent points.

43. A method according to claim 37, wherein said jump error correcting step is obtained by calculating a most recent velocity vector for the person from a preceding segment, estimating a next fix based upon said most recent velocity vector from the preceding segment, using the estimated next fix for a first point after signals are received from a different sub-set of satellites, and determining a subsequent segment measured between first and second fixes received from the different sub-set of satellites.

44. A method according to claim 37, wherein said jump error correcting step is obtained by maintaining a lookup table of offset values for each possible combination of satellite sub-sets, and subtracting a corresponding offset value from the fix for a first point after signals are received from a different subset of satellites.

* * * * *